United States Patent [19]

Vanhaeren

[11] Patent Number: 4,855,382

[45] Date of Patent: Aug. 8, 1989

[54] CROSS-LINKABLE HOT MELT ADHESIVE COMPOSITION

[75] Inventor: Gerard M. Vanhaeren, Rixensart, Belgium

[73] Assignee: Exxon Chemical Patents Inc., Linden, N.J.

[21] Appl. No.: 227,971

[22] Filed: Aug. 3, 1988

[30] Foreign Application Priority Data

Aug. 4, 1987 [GB] United Kingdom ............... 8718380

[51] Int. Cl.$^4$ .............................................. C08G 18/80
[52] U.S. Cl. ................................................. 528/45
[58] Field of Search .......................................... 528/45

[56] References Cited

U.S. PATENT DOCUMENTS 4,263,444 4/1981 Graham et al. ...................... 528/45
4,609,717 9/1986 Greigger et al. ..................... 528/45

Primary Examiner—Maurice J. Welsh
Attorney, Agent, or Firm—J. F. Hunt

[57] ABSTRACT

A hot melt adhesive contains a copolymer of at least 50 wt. % ethylene containing hydroxyl functionality having a melt viscosity of from 1 to 100 Pa.s at 180° C., an internally blocked polyisocyanate and a viscosity reducing agent such as a tackifier.

12 Claims, No Drawings

CROSS-LINKABLE HOT MELT ADHESIVE COMPOSITION

This invention relates to cross-linkable compositions which may be applied as a melt and subsequently cured at a temperature above the application temperature.

Hot melt adhesives based on ethylene-vinyl acetate copolymers are known. Although reasonably effective for certain applications, they fail in certain assembly applications due to their poor cohesive properties at temperatures of above about 60° C. In these cases, the bond strength develops on cooling but the cohesive properties are always limited at a given temperature due to the thermoplastic nature of the hot melt components.

Compositions capable of providing high adhesion with good heat resistance are suggested in Japanese Patent Publication No. 46 40419 which discloses a hot-melt adhesive comprising firstly a saponified ethylene/-vinyl acetate copolymer and secondly 1-5 parts by weight of an isocyanate adduct whose isocyanate groups are masked and which may be activated by heat to produce free isocyanate groups with 0.1 to 10 parts by weight of a tertiary amine or polyamine salt of a carboxylic acid or a polyvalent metal dithiocarbamate which lowers the decomposition temperature of the isocyanate adduct.

Activation of the masked isocyanates of these components releases the generally volatile masking material which will form undesirable by-products and defects in the adhesive film.

EP No. 30594 discloses a coating powder containing hydrolysed vinyl acetate copolymer and polyuretonimines obtained by reaction of polycarbodiimides with di- and tri-isocyanates. The formation of volatile by-products is avoided.

GB No. 1079749 describes a cross-linkable coating composition (for moulding into pipes and hoses and for cables and wires for example) not as such suitable for hot melt adhesive compositions containing a polymer of a monoethylenically unsaturated monomer and units having certain functional groups a.o. hydroxyl, and a polyisocyanate generator including aromatic internally blocked isocyanates such as specified uretidione aromatic dimers and alkylene uretidione dimers in general. The blocked products have a rate of decomposition varying with temperature which causes cross-linking at temperatures above 120° C.

It is amongst the aims of the invention to provide a hot melt adhesive composition curable by heating, which is stable before curing, which cures in a controllable manner at elevated temperatures appropriate to hot melt adhesive application, has a desired balance of properties for convenient application and/or provides a flexible thermally stable bond without generating volatiles.

According to this invention there is provided a hot melt adhesive composition comprising:

(a) a copolymer of at least 50 wt % ethylene containing hydroxyl functionality having a melt viscosity of from 1 to 100 Pa.s at 180° C.

(b) an internally blocked polyisocyanate (c) a viscosity reducing component.

The term internally blocked is used to indicate that there are uretdione groups present which unblock at certain temperatures to free the isocyanate groups for cross-linking purposes. The softening and melting characteristics of the copolymer, the unblocking characteristics of the polyisocyanate and the viscosity reducing component can be combined to provide an overall composition suitable for demanding hot melt adhesive applications.

Suitably the copolymer is a polymer having monomeric units ethylene and of vinyl alcohol, and optionally vinyl acetate, the melt viscosity being preferably from 4 to 40 Pa.s at 180° C. The internally blocked polyisocyanate has at least two uretdione groups and conveniently has no free isocyanate groups before unblocking and is a cycloaliphatic polyisocyanate, preferably having an unblocking rate or behaviour such that unblocking occurs to a significant extent with the composition substantially molten, the rate of unblocking and hence cross-linking being variable by temperature control, suitably in a region at from 150° to 200° C. Ethylene vinyl alcohol copolymers have preferably at least 5 wt % of vinyl alcohol units. One example is a terpolymer (viscosity 20 Pa.s at 180° C., MFR at 125° C. under 325 gm load of 6.4 gm/10 min) with 10% vinyl alcohol, 88.75% ethylene and 1.2 wt % vinyl acetate. The m.p. is 101.5° C. (by DSC). Another terpolymer contains 13.7 wt % vinyl alcohol, 82.3% ethylene and 4.0 wt % vinyl acetate (viscosity 5.8 Pa.s at 180° C., MFR at 125° C. under 325 gm (cf. 30.4 gm/10 min, DSC m.p. 91° C.). Copolymers of the above stated type help to provide a suitable characteristic to the hot melt adhesive composition. It is surmised that the unblocking reaction and the melting of the copolymer influence one another.

The copolymers including those referred to above, containing functional hydroxyl groups may be copolymers of ethylene and vinyl alcohol obtained by hydrolysis or transesterification of ethylene-vinyl carboxylate (e.g. ethylene-vinyl acetate) copolymer. The degree of hydrolysis can be partial or total, partial hydrolysis leaving some ester groups in the polymer.

Usually the carboxylic acid from which the carboxylate is derived has from 1 to 6 carbon atoms per molecule and the especially preferred vinyl carboxylate from which the vinyl alcohol is derived is vinyl acetate. The transesterification may be effected by reaction in the melt stage at about 100° C. with, for example, n-butanol using sodium methylate as a catalyst. Examples of other copolymers are those of ethylene and hydroxyalkyl acrylates such as, e.g. 2-hydroxyethyl acrylate, 2-hydroxypropyl acrylate, 4-hydroxybutyl acrylate and the corresponding methacrylic acid esters.

The preferred copolymers of ethylene and vinyl alcohol are obtained from ethylene vinyl acetate copolymers having a melt flow index (ASTM D1238 52 T) of 100 to 3000, preferably from 400 to 2000, especially greater than 300 and comprise at least 50 wt. % of ethylene and at least 5 wt. % of vinyl alcohol units.

The second component of the hot melt adhesive composition is a uretdione group containing isocyanate. The isocyanate groups are blocked with themselves so that no extraneous blocking agent is released on heating. By being internally blocked or masked, the isocyanate can be protected for reacting with the vinyl alcohol groups of the copolymer and reactive groups of the third component until the "unblocking" or decomposition temperature is reached. The internally blocked isocyanate may contain urethane groups as well as uretdione groups. Unblocking of the uretdione groups will occur without ruption of the urethane groups.

Preferably no catalyst or decomposition activator is used.

It is important that the compounds contain no free isocyanate groups until deblocking occurs and contain at least two free isocyanate groups after deblocking. The uretdione group is of the following structure:

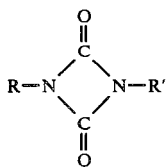

wherein R and R' contain cycloaliphatic groups, which are believed to be split at elevated temperatures to yield the isocyanate

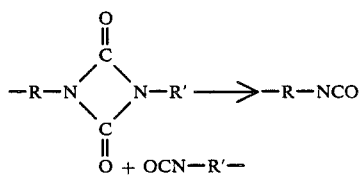

Thus in order to provide the two free isocyanate groups required in the curing of the adhesive system, the internally blocked isocyanate should contain at least 2 rings per molecule, i.e.

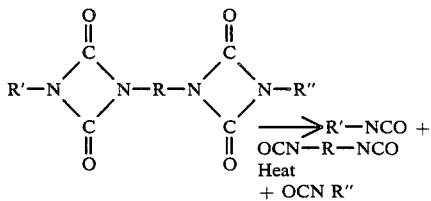

A particularly suitable internally blocked isocyanate is the product marketed by Huls as IPDI BF 1540. It contains about 15 wt.% of blocked isocyanate and is an isophorone diisocyanate derivative.

Alternatively a hydrogenated aromatic compound can be used, such as 4,4' methylene dicyclohexyl diisocyanate or 1,3 cyclohexylene dimethyl diisocyanate compound can be used or non-cyclic aliphatic diisocyanates such as 1.6 - hexamethylene diisocyanate and 2.2.4 - trimethyl - 1.6 - diisocyanate n-hexane.

It is important that if the internally blocked isocyanate also contains external isocyanate groups these be reacted so that they cannot react with the functional copolymer at the temperature at which the polymer and the internally blocked polyisocyanate are mixed. We believe this to be the case with IPDI BF 1540 which is believed to be an adduct of the uretidinedione dimer of isophorone diisocyanate

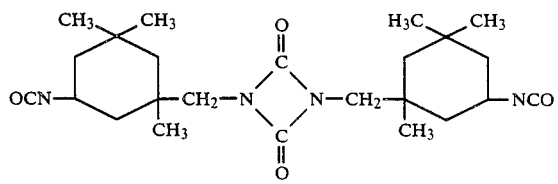

with an alkane diol such as butane diol. This type of material is described in U.S. Pats. No. 4,463,154 and 4,483,798.

The hot melt adhesive composition contains a third component to decrease the viscosity of the formulation at temperatures below its heat activation temperature to facilitate handling, to preferably act as an adhesion promoter and also to provide more flexibility to the ultimate crosslinked adhesive.

The third component of the hot melt adhesive composition is preferably either (a) a tackifying resin which may be hydrocarbon resin such as the Escorez resins commercialised by Exxon Chemical International or synthetic or natural terpene and/or rosin tackifiers or (b) a polyhydroxy-or poly-amino compound, or a mixture of both. The third component may for suitable application and hot melt adhesive characteristics be selected so as to substantially not react with the unblocked polyisocyanates. In other fields of use the viscosity reducing agent can take part in the reaction with the freed polyisocyanate.

Suitable polyhydroxy or polyamino compounds may be any di-, tri- or tetra- functional hydroxy or amino compound, having an aliphatic structure such as an alkane diol or an alkane diamine. Suitable polyhydroxy or polyamino compounds may be polyether polyols, polyester polyols, polyamines traditionally used in the manufacture of polyurethanes. The molecular weight of suitable polyhydroxy - or polyamino compounds is from 80 to 7000, preferably 500 to 5000. These compounds are well known and are commercially available. Preferred polyhydroxy compound are the polyoxyalkylene triols made from propylene oxide and low molecular weight triols such as trimethylol propane or glycerol.

In preparing the hot melt adhesive the IPDI BF 1540 should be mixed at a temperature below that at which the internally blocked isocyanate begins to unblock to an appreciable extent. We prefer that the internally blocked isocyanate be present in an amount to provide upon activation from 0.1 to 1.0 moles of isocyanate per mole of function reactive with isocyanate in the adhesive formulation.

When the third component used is a tackifying resin typical quantities of the components are 90 to 40 wt. %, preferably 50 to 75 wt. % of the ethylene copolymer, 10 to 60 wt. %, preferably 25 to 50 wt. % of the tackifying resin based on the total weight of the two components.

When the third component used is a polyhydroxy or polyamine compound typical quantities of the components are 70 to 95 wt. %, preferably 80 to 90 wt. % of the ethylene copolymer and 5 to 30 wt. %, preferably 10 to 20 wt. % of the third component based on the total weight of the two components.

It is preferred that the composition comprises 50 to 90 wt. % of the ethylene copolymer, 10 to 50 wt. % of the third component and an internally blocked isocyanate in an amount so as to provide upon activation by heat from 0.1 to 1.0 mole of isocyanate per mole of function reactive with isocyanate in the adhesive formulation.

The adhesives are applied as a film, powder of hot melt at a temperature below where appreciable activation of the internally blocked isocyanate takes place and cured after application by heating to a temperature where the polyisocyanate concerned unblocks sufficiently quickly. When using IPDI BF 1540, we have found that temperatures in the range 150° C. to 200° C. are adequate. By using the compositions of this invention and curing them by heating to a temperature above the unblocking temperature of the isocyanate, it is found that strong adhesive bonds which are still effective at temperatures as high as 150° C. when tested under Shear conditions can be obtained as compared with about 70° C. for conventional ethylene vinyl acetate copolymer based hot melt adhesives. Good bonding to metal surfaces can be achieved particularly.

EXAMPLE 1

In this example, the hot melt adhesive formulations set out in Table I were prepared from:

(A) an ethylene-vinyl alcohol copolymer (EVOH) having a viscosity at 180° C. of 36 Pa.s and containing 14.75 wt. % vinyl alcohol.

(B) an internally blocked polyisocyanate, the adduct of uretidinedione of isophorone diisocyanate and a diol (abbreviated to IPDI BF 1540, supplied by Huls).

(C) a commercially available tackifying resin, Escorez 4401, available from Exxon Chemical Company.

The formulation was first mixed at a temperature between 110° C. and 120° C. then applied between 0.1 mm aluminium foils as a substrate and then cured by heating at 180° C. for 20 minutes (compositions (3) and (4) of Table I) or at 175° C. for 30 minutes (composition (2) of Table 1) under a pressure of 5–10 kg/cm² so as to produce an adhesive layer of 80–120 microns.

The adhesion T-peel strength, Shear Adhesion Failure Temperature (SAFT) and Peel Adhesion Failure Temperature (PAFT) were measured and the results are also given in Table I.

The T-peel strength was determined using a tensometer at a pulling speed of 5.08 cm per minute and a 2 cm wide strip specimen.

The Shear Adhesion Failure Temperature (SAFT) was determined on a one square inch specimen and 1 kg load hung in a ventilated oven. The temperature was raised continuously at a 24° C. per hour rate. The SAFT is the temperature at which the bond failed. If the bond has not failed at 150° C., the temperature was then maintained at 150° C. for one hour and the results reported as >150° C.

The Peel Adhesion Failure Temperature (PAFT) was carried out using a 2.5 cm wide and 5 cm long adhesive bond in the 180° C. peel mode and 0.5 kg load. The temperature was raised continuously at 24° C. per hour rate. PAFT is the temperature at which the bond failed.

As a comparison a blend of EVOH and tackifying resin but containing no IPDI BF 1540 was also applied at 180° C. (composition 1 of Table I).

TABLE I

| Composition | (1)* | (2) | (3) | (4) |
|---|---|---|---|---|
| EVOH | 5 | 10 | 5 | 5 |
| IPDI BF 1540 | — | 4.7 | 2.34 | 1.17 |
| (Mole ratio OH/NCO) |  | (2) | (2) | (4) |
| Escorez 4401 | 5 | — | 5 | 5 |
| Cure Temperature (°C.) | — | 175 | 180 | 180 |
| Cure Time (min) | — | 30 | 20 | 20 |
| T-Peel (N/2 cm) | 10–13 | 12–16 | 17–20 | 20–26 |
| SAFT (°C.) | 97 | >150 | >150 | >150 |
| PAFT (°C.) | 82 | 102 | 82 | 95 |

*(1) Was applied at 180° C. and kept at that temperature for 2 minutes using the same substrate

EXAMPLE 2

In this example, an EVOH was used having a viscosity of 20.1 Pa.s at 180° C. containing 10 wt. % vinyl alcohol. The tackifying resin used was Escorez 4401.

The adhesive properties were measured as in Example 1 and are set out in Table II.

TABLE II

| Composition (gms) | | | | | | | |
|---|---|---|---|---|---|---|---|
| EVOH | 10 | 10 | 10 | 7 | 7 | 5 | 5 |
| IPDI BF 1540 | 6.35 | 3.18 | 1.59 | 2.22 | 1.11 | 1.59 | 0.795 |
| (Mole OH/NCO) | (1) | (2) | (4) | (2) | (4) | (2) | (4) |
| Escorez 4401 | — | — | — | 3 | 3 | 5 | 5 |
| Cure Temperature (°C.) | 180 | 180 | 180 | 180 | 180 | 180 | 180 |
| Cure Time (min) | 20 | 20 | 20 | 20 | 20 | 20 | 20 |
| T-Peel (N/2 cm) | 1–2 | 14–16 | 13–20 | 10–16 | 22–35 | 20–35 | 18–27 |
| SAFT (°C.) | >150 | >150 | >150 | >150 | >150 | >150 | >150 |
| PAFT (°C.) | 42 ± 2 | 76 | 94 | 93 ± 7 | 100 ± 2 | 90 ± 2 | 96 ± 2 |

EXAMPLE 3

Example 2 was repeated using the commercially available tackifying resin Escorez 1310 instead of Escorez 4401.

The results obtained are set out in Table III.

TABLE III

| Composition (gms) | | | |
|---|---|---|---|
| EVOH | 7 | 5 | 5 |
| IPDI BF 1540 | 2.22 | 1.59 | 0.795 |
| (Mole Ratio OH/NCO) | (2) | (2) | (4) |
| Escorez 1310 | 3 | 5 | 5 |
| Cure Temperature (°C.) | 180 | 180 | 180 |
| Cure Time (min) | 20 | 20 | 20 |
| T-Peel (N/2 cm) | 30 ± 3 | 24 ± 2 | 30 ± 5 |
| SAFT (°C.) | >150 | >150 | >150 |
| PAFT (°C.) | 90 ± 3 | 97 ± 3 | 95 ± 2 |

EXAMPLE 4

In this example, the hot melt adhesive formulations set out in Table IV were prepared from:

A. An ethylene-vinyl alcohol copolymer (EVOH) containing 10 wt. % vinyl alcohol and having a viscosity of 20.1 Pa.s. at 180° C.

B. IPDI BF 1540.

C. A polyoxypropylene triol having an average molecular weight of 4000 and an hydroxyl index of 43±2 and having a viscosity at 20° C. of 950±20 Pa.s. (Tercarol ®745 from Carbochim).

The results are set out in Table IV.

TABLE IV

| Composition (gms) | | |
|---|---|---|
| A EVOH | 8 | 8 |
| B IPDI BF 1540 | 5.52 | 2.76 |
| (Mole OH/NCO) | (1) | (2) |
| C Tercarol ® 745 | 2 | 2 |
| Cure Temperature (°C.) | 180 | 180 |

TABLE IV-continued

| Composition (gms) | | |
| --- | --- | --- |
| Cure Time (minutes) | 20 | 20 |
| T-Peel (N/2 cm) | 28 ± 2 | 40 ± 5 |
| SAFT (°C.) | >150 | >150 |
| PAFT (°C.) | 58 ± 2 | 91 |

EXAMPLE 5

Hot melt adhesive formulations set out in Table V were prepared from:
A: An ethylene-vinyl alcohol copolymer (EVOH) containing 14.2 wt % vinyl alcohol and having a viscosity of 8.3 Pa.s at 180° C.
B: IPDI BF 1540
C: Escorez (Registered Trade Mark) 1310 a tackifying resin or Escorez 4401.
The results obtained are given in Table V.

TABLE V

| Composition (gms) | | | | | | |
| --- | --- | --- | --- | --- | --- | --- |
| EVOH | 7 | 6 | 5 | 7 | 6 | 5 |
| IPDI BF 1540 | 1.58 | 1.354 | 1.128 | 1.58 | 1.354 | 1.128 |
| (Mole Ratio OH/NCO) | (4) | (4) | (4) | (4) | (4) | (4) |
| Escorez 1310 | 3 | 4 | 5 | — | — | — |
| Cure Temperature (°C.) | 180 | 180 | 180 | 180 | 180 | 180 |
| Cure Time (min) | 20 | 20 | 20 | 20 | 20 | 20 |
| T-Peel (N/2 cm) | 35–45 | 25–35 | 25–31 | 33–45 | 30–34 | 20–35 |
| SAFT (°C.) | >150 | >150 | >150 | >150 | >150 | >150 |
| PAFT (°C.) | 94 ± 2 | 97 ± 3 | 84 ± 2 | 93 ± 2 | 85 ± 3 | 86 ± 2 |

EXAMPLE 6

Hot melt adhesive formulation set out in Table VI were prepared from:
A: An ethylene-vinylalcohol copolymer (EVOH) containing 13.7 wt. % vinyl alcohol and having viscosity of 5.8 Pa.s. at 180° C.
B: IPDI BF 1540
C: Escorez 1310, a tackifying resin.
The results obtained are given in Table VI.

TABLE VI

| Composition (gms) | | | | | | |
| --- | --- | --- | --- | --- | --- | --- |
| EVOH | 6 | 6 | 6 | 6 | 6 | 6 |
| IPDI BF 1540 | 1.306 | 0.871 | 0.653 | 1.306 | 0.871 | 0.653 |
| (Mole Ratio OH/NCO) | (4) | (6) | (8) | (4) | (6) | (8) |
| Escorez 1310 | 4 | 4 | 4 | 4 | 4 | 4 |
| Cure Temperature (°C.) | 180 | 180 | 180 | 200 | 200 | 200 |
| Cure Time (min) | 20 | 20 | 20 | 6 | 6 | 6 |
| T-Peel (N/2 cm) | 35–40 | 35–45 | 27–35 | 32–38 | 36–38 | 32–40 |
| SAFT (°C.) | >150 | >150 | >150 | >150 | >150 | >150 |
| PAFT (°C.) | 90 ± 3 | 87 ± 3 | 80 ± 5 | 94 ± 5 | 96 ± 4 | 87 ± 2 |

I claim:
1. A hot melt adhesive composition comprising:
(a) a copolymer of at least 50 wt % ethylene containing hydroxyl functionality having a melt viscosity of from 1 to 100 Pa.s at 180° C.
(b) an internally blocked polyisocyanate
(c) a viscosity reducing component.
2. Composition according to claim 1, wherein the copolymer is a polymer having monomeric units of vinyl alcohol and optionally vinyl acetate, the melt viscosity being preferably from 4 to 40 Pa.s.
3. Composition according to claim 1 wherein the internally blocked polyisocyanate has at least two uretdione groups and has no free isocyanate groups before unblocking.
4. Composition according to claim 3 wherein the internally blocked polyisocyanate is a cycloaliphatic polyisocyanate.
5. Composition according to claim 1 wherein the internally blocked diisocyanate has the general formula:

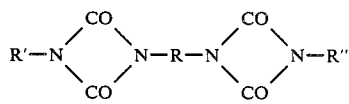

wherein R, R' and R" are the same or different and R is cycloaliphatic and R' and R" are non-aromatic.
6. Composition according to claim 1 wherein the copolymer of ethylene is an ethylene vinyl acetate copolymer at least 50 wt % having a melt flow index of 10 to 2500 and comprises at least 5 wt. % vinyl alcohol units.
7. Composition according to claim 1 in which the viscosity reducing component is a non-crosslinking tackifying resin.
8. Composition according to claim 1 in which the viscosity reducing component contains at least two groups reactive with isocyanate groups.
9. The composition of claim 8 wherein said viscosity reducing component is selected from polyether polyols, polyester polyols, polyamines, and polyether amines.
10. A composition according to claim 8 wherein said viscosity reducing component is a polyether or polyester polyol of average molecular weight from 200 to 7000.
11. A composition according to claim 1 wherein the said viscosity reducing component is a polyoxypropylene triamine.
12. A composition according to claim 1 comprising 40 to 90 wt. % of said copolymer, 10 to 60 wt. % of said viscosity reducing component, and the internally blocked isocyanate in an amount so as to provide, upon activation by heat, from 0.1 to 1.0 mole of isocyanate per mole of function reactive with isocyanate in the adhesive formulation.

* * * * *